United States Patent
Kneip et al.

(10) Patent No.: US 7,428,953 B2
(45) Date of Patent: Sep. 30, 2008

(54) GAS SPRING WITH END POSITION DAMPING

(75) Inventors: Alexander Kneip, Macken (DE); Mark Rössner, Koblenz (DE)

(73) Assignee: Stabilus GmbH, Koblenz (DE)

(*) Notice: Subject to any disclaimer, the term of this patent is extended or adjusted under 35 U.S.C. 154(b) by 269 days.

(21) Appl. No.: 11/185,600

(22) Filed: Jul. 20, 2005

(65) Prior Publication Data

US 2006/0016650 A1    Jan. 26, 2006

(30) Foreign Application Priority Data

Jul. 22, 2004   (DE)   ........................ 10 2004 035 613

(51) Int. Cl.
*F16F 9/34* (2006.01)
*F16F 5/00* (2006.01)

(52) U.S. Cl. ............................. 188/322.15; 188/322.19; 188/313

(58) Field of Classification Search ............ 188/322.13, 188/322.15, 322.16, 322.18, 322.19, 288, 188/313; 267/64.11
See application file for complete search history.

(56) References Cited

U.S. PATENT DOCUMENTS

| | | | |
|---|---|---|---|
| 4,230,309 A | 10/1980 | Schnitzius | |
| 4,466,514 A | 8/1984 | Möolders et al. | |
| 4,467,899 A | 8/1984 | Möolders et al. | |
| 4,909,488 A | 3/1990 | Seibert et al. | |
| 5,157,806 A * | 10/1992 | Wartian | 16/66 |
| 5,477,589 A * | 12/1995 | Lan | 16/51 |
| 5,738,191 A * | 4/1998 | Forster | 188/318 |
| 5,887,857 A * | 3/1999 | Perrin | 267/64.12 |
| 5,971,117 A * | 10/1999 | Grundei et al. | 188/288 |
| 6,336,624 B1 * | 1/2002 | Kulhavy | 267/64.12 |
| 6,681,906 B1 | 1/2004 | Sasse | |
| 7,111,711 B2 * | 9/2006 | Grundei | 188/288 |
| 2002/0038599 A1 | 4/2002 | Mintgen et al. | |
| 2003/0006539 A1 | 1/2003 | Bertram et al. | |

FOREIGN PATENT DOCUMENTS

| | | |
|---|---|---|
| DE | 201 07 426 | 8/2001 |
| EP | 0 198 180 | 10/1986 |
| EP | 0 786 607 A1 | 7/1997 |
| EP | 0 798 485 | 10/1997 |

* cited by examiner

*Primary Examiner*—Melody M Burch
(74) *Attorney, Agent, or Firm*—Cohen Pontani Lieberman & Pavane LLP

(57) ABSTRACT

The invention relates to a gas spring with end position damping having a piston-cylinder unit which is provided with two identically configured pistons arranged in a mirror-like image. Each piston has two axially extending parts defining an annular groove therebetween. The groove is configured to receive an annular sealing ring operative to axially move within the groove. The groove, the pistons and cylinder are configured with an arrangement of flow passages providing damping at the end of the push-in and push-out strokes of the piston.

17 Claims, 4 Drawing Sheets

GAS SPRING WITH END POSITION DAMPING

BACKGROUND OF THE INVENTION

1. Field of the Invention

The invention relates to a gas spring with end position damping.

2. Description of the Related Art

Such a gas spring is used in particular in doors or tailgates of a motor vehicle and has end position damping at the end of both the push-in stroke and the push-out stroke. The spring prevents violent striking in the end position of the door, for example, and its subsequent bouncing.

Extending over the displacement path are one or more grooves of constant cross section which have a groove runout with decreasing cross section at their two ends. During a movement in the push-out direction of the piston rod, only the region under which flow can occur at the radially inner annular surface of the sealing ring is available for a flow of pressurized gas from a second working chamber into a first working chamber. The consequence of this small throughflow cross section is that the push-out speed of the piston rod is low to begin with and requires high acceleration forces.

A need, therefore, exists for a gas spring which is of simple construction and can be moved with low acceleration forces in both the push-out direction and the push-in direction and also dampens in both end position regions.

SUMMARY OF THE INVENTION

The inventive spring is configured so that in the first piston, on the side remote from the piston rod, a second piston of the same construction as the first piston is arranged at a distance from the first piston. The first groove side wall of this second piston is arranged closer to the first working chamber, and the second groove side wall of this second piston is arranged closer to the second working chamber.

In the pushed-out state, the sealing ring of the first piston, which bears against the first groove side wall of the first piston, is located at the end of the region of the reduced cross section of the recesses in the inner wall of the cylinder, whereas the sealing ring of the second piston is still located in or close to the region of constant cross section of the recesses.

When the piston rod is pushed in, the sealing ring abuts against the second groove side wall. Since the throughflow openings of the second groove side wall are open, pressurized gas can flow through from the second working chamber under the sealing ring into the first working chamber, and the piston can be pushed in immediately in an undamped manner and with low acceleration forces. During further travel over the recesses in the inner wall of the cylinder, the cross section with which flow can occur over the sealing ring is immediately increased. In the region of the second piston, the maximum possible overflow cross section is available at least roughly at the same time, so that no damping is effected here either.

When the pushed-in state is reached, damping is effected in an manner equivalent to that when the pushed-out state is reached.

A push-out movement from the pushed-in end position is likewise effected in an undamped manner equivalent to the push-in movement from the pushed-out end position.

In order to maintain the distance between the first piston and the second piston, a spacer of smaller radial extent than the diameter of the pistons may be arranged between the first piston and the second piston.

A simple means of fastening the pistons to the piston rod consists in the fact that the first piston and the second piston have a coaxial through-hole, with which they are arranged on an end stem of the piston rod.

In this case, a simple means of fastening the spacer is also obtained if the spacer is a spacer sleeve arranged on the end stem of the piston rod.

If the distance between the second groove side wall of the first piston and the first groove side wall of the second piston and/or between the second groove side wall of the second piston and the first groove side wall of the first piston corresponds at least approximately to the length of the cross-sectional reduction of the recesses on the inner wall of the cylinder, the second piston does not produce disturbing damping during the retraction movement and the first piston does not produce disturbing damping during the extension movement.

In order to obtain both a low-wear and sound sealing effect relative to the inner wall of the cylinder and reliable closure of the passages of the first side walls, the sealing rings may have a rectangular cross section.

If the second groove side wail of the first and/or of the second piston is a star disc whose gaps formed between the star serrations arranged in a radially encircling manner form the permanently open throughflow openings, this provides for ease of manufacture and forms a good supporting surface for the sealing rings.

If one or more nozzle-like connecting openings which connect the working chambers are arranged in the first piston or pistons, pressurized gas can additionally flow from the one to the other working chamber. In addition, the piston can be retracted into a recess-free end region of the cylinder, the nozzle-like connecting openings producing constant damping.

If the connecting opening can be shut off in one direction of flow, a different moving behaviour can be achieved between the push-in movement and the push-out movement in the region of constant cross section of the recesses in the inner wall of the cylinder.

To this end, the connecting opening can be capable of being shut off by a non-return valve in a simple manner.

Depending on the direction of movement, a different moving behaviour can also be achieved if the passage cross sections of the connecting openings through which flow can occur in opposite directions are different.

The piston or pistons may have a damping channel which forms the connecting opening and whose one end opens radially outwards at the radially encircling lateral surface of the piston and whose other end opens radially outwards into that region at the radially inner annular surface of the sealing ring under which flow can occur.

In this case, the damping characteristic of the damping channel can be achieved by the damping channel running at least partly in a labyrinth-like manner.

Hydraulic damping in an end position of the piston can be achieved by the gas spring having an at least approximately perpendicular fitted position, and by the bottom working chamber being filled with hydraulic fluid, in particular with oil, in its end region having no recesses in the inner wall of the cylinder.

Exemplary embodiments of the invention are shown in the drawing and are described in more detail below.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
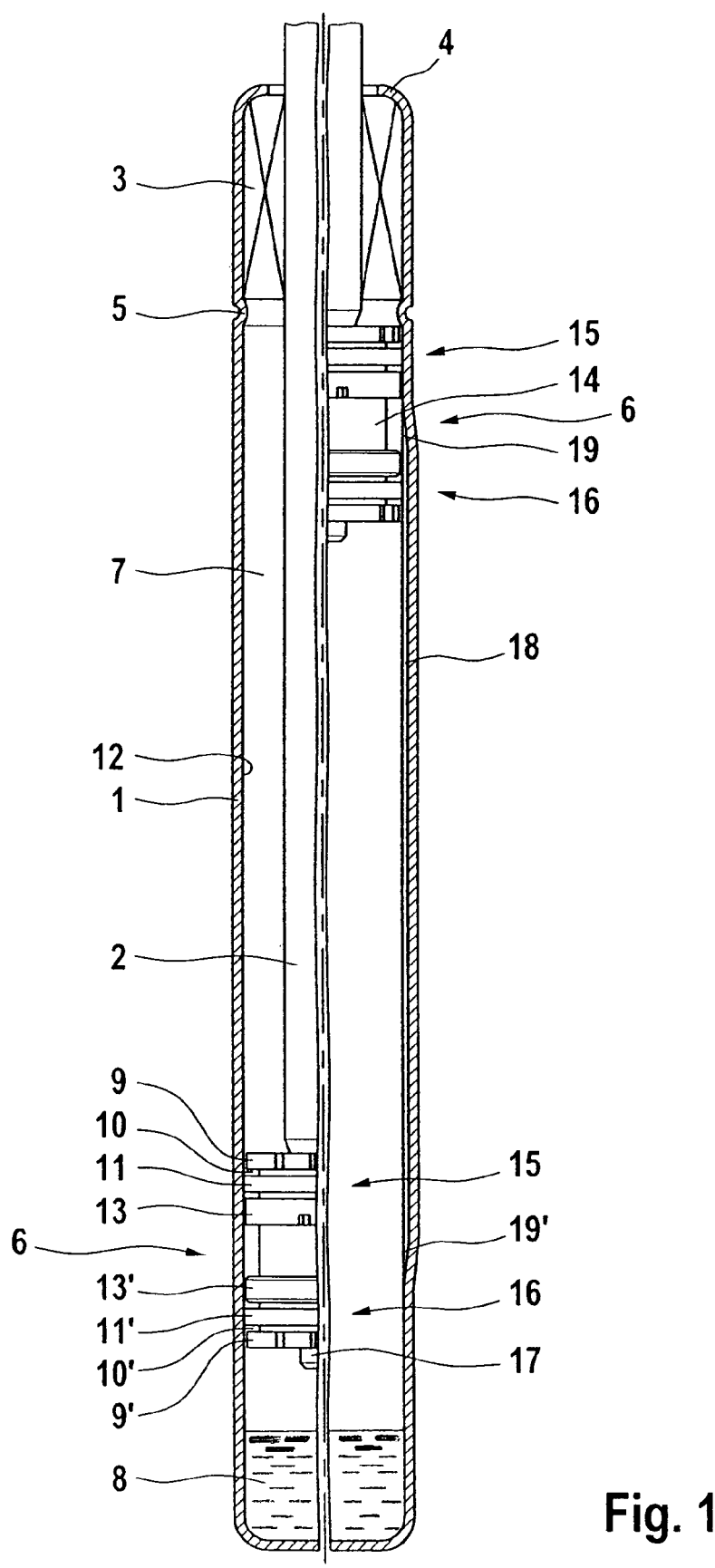
FIG. 1 shows a longitudinal section of a gas spring of the present invention.

The gas spring shown in FIG. 1 has a cylinder 1 which is closed at one end. At its other end, a piston rod 2 is led out of the cylinder 1 in a sealed-off manner through a guide seal assembly 3. The guide seal assembly 3 is axially secured at its one end by the orifice end 4, flanged radially inwards, of the cylinder 1 and at its other end by a radially encircling, inwardly directed bead 5 of the cylinder 1.

Fastened to that end of the piston rod 2 which projects into the interior space, filled with pressurized gas, of the cylinder 1 is a piston assembly 6, which subdivides the interior space of the cylinder 1 into a first working chamber 7 on the piston-rod side and a second working chamber 8 remote from the piston rod.

As viewed from the first working chamber 7 to the second working chamber 8, the piston assembly 6 consists of a first piston 15, in whose radially encircling lateral surface a radially encircling piston groove 10 is formed. Arranged in the piston groove 10 is a sealing ring 11 of rectangular cross section, which bears with its outer radially encircling lateral surface against the inner wall 12 of the cylinder 1.

The piston groove 10 is configured to receive the sealing ring 11 with an axial play.

Flow can occur under the sealing ring 11 between the base of the piston groove 10 and the inner radially encircling lateral surface of the sealing ring 11.

The piston groove 10 is defined by a first groove side wall 13 on the side closer to the second working chamber 8.

The groove side wall closer to the first working chamber 7 is designed as a star disc 9, the gaps of which, formed between the serrations arranged in a radially encircling manner, project radially further inwards than the point at which the base of the piston groove 10 is located.

During a push-in movement and when the sealing ring 11 bears against the star disc 9, pressurized gas can flow through from the second working chamber 8 under the sealing ring 11 through the gaps of the star disc 9 to the first working chamber 7.

A spacer sleeve 14 of the piston assembly 6 coaxially adjoins the first groove side wall 13 on the side remote from the piston groove 10, and a second piston 16 of the piston assembly 6 in turn coaxially follows this spacer sleeve 14.

The second piston 16 has, in mirror image, the same construction and the same design as the first piston 15 and has a first groove side wall 13', a piston groove 10' and a sealing ring 11' and also a star disc 9'.

The entire piston assembly 6 has a coaxial through-hole and is thus firmly arranged on an end stem 17 of the piston rod 2.

Arranged on the inner wall 12 of the cylinder 10 over the displacement path of the piston assembly 6 is a recess of constant cross section, which is formed as a groove 18 and whose ends, forming groove runouts 19 and 19', reduce its cross section.

The free end, projecting from the cylinder 1, of the piston rod 2 is linked to a movable part (not shown), such as a tailgate of a motor vehicle for example, whereas the cylinder 1 is linked at its closed end to a fixed part of the motor vehicle.

When the tailgate is closed, the piston assembly 6 and the piston rod 2 are located in the pushed-in position.

Figure 2:
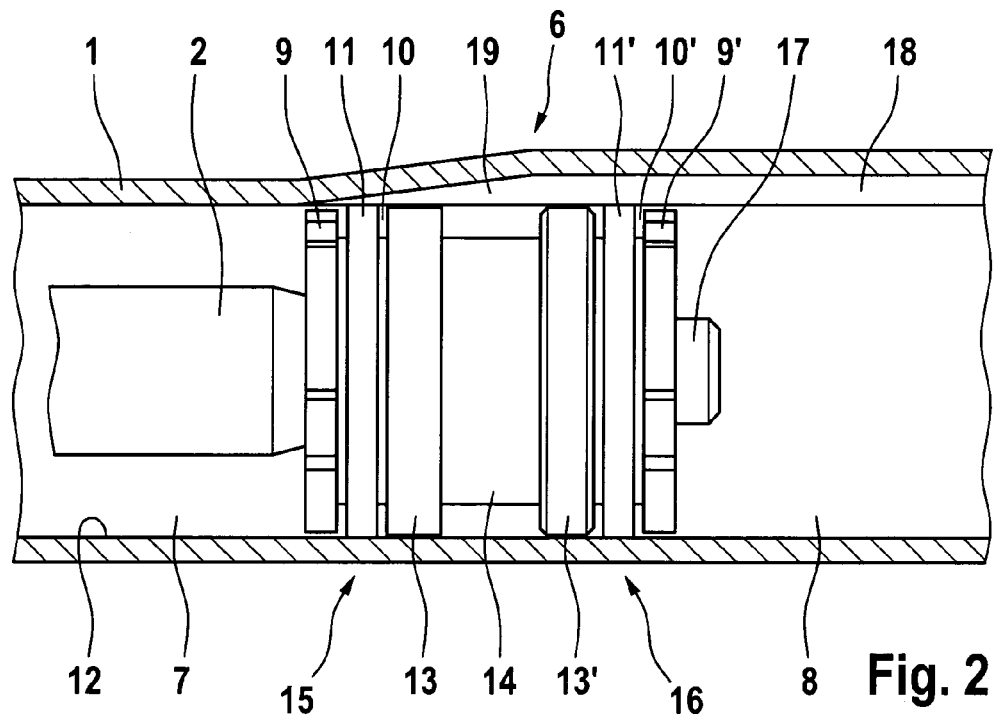
FIG. 2 shows an enlarged detail of the gas spring according to FIG. 1 in the pushed-out end position.
Figure 3:
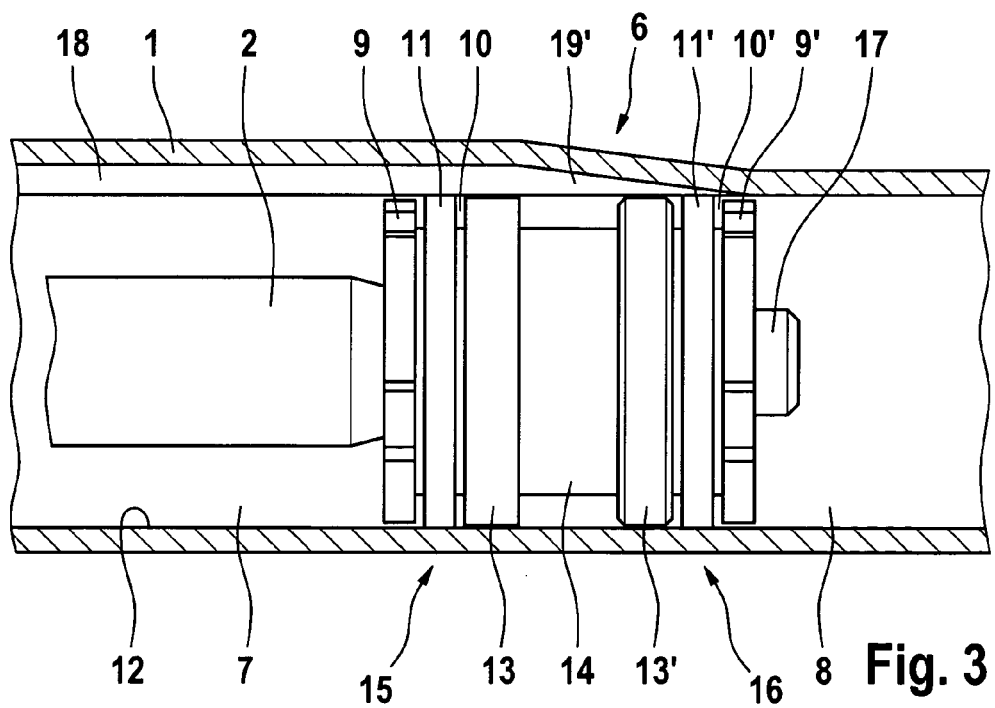
FIG. 3 shows an enlarged detail of the gas spring according to FIG. 1 in the retracted end position.
Figure 4:
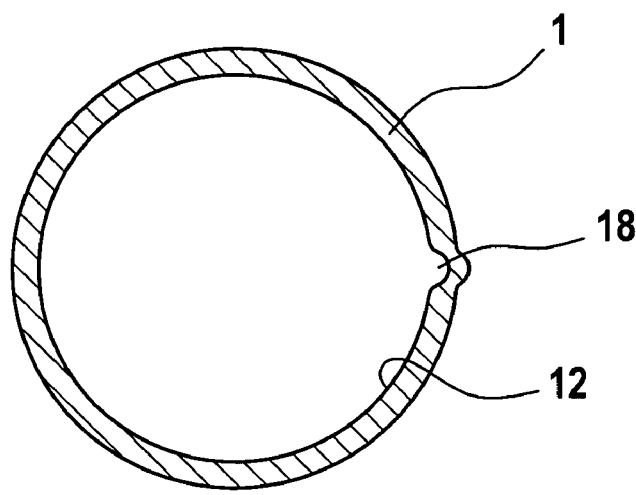
FIG. 4 shows a cross section of the cylinder of the gas spring according to FIG. 1.

When the tailgate is opened, as better illustrated in FIG. 2, the larger effective area of the second piston 16 relative to the effective area of the first piston 15 causes the piston assembly 6 and the piston rod 2 to be pushed out.

In the process, the sealing ring 11' comes to bear against the star disc 9', so that pressurized gas can flow through from the first working chamber 7 under the sealing ring 11' and through the gaps of the star disc 9' to the second working chamber 8. As the movement continues, flow then additionally occurs over the sealing ring 11' in the region of the groove 18.

Since the first piston 15 is located in the region of constant cross section of the groove 18, this start of the push-out movement is already effected in an undamped manner.

In the process, the sealing ring 11 of the first piston 15 bears against the first groove side wall 13. Pressurized gas can only flow via the groove 18 from the first working chamber 7 to the second working chamber 8.

If the piston 15 reaches the end of the groove runout 19, the cross section of flow is reduced until it is completely closed at the end of the groove runout 19 by the sealing ring 11.

As a result, damping of the end of the push-out movement is achieved.

During the closing movement of the tailgate and thus when piston assembly 6 and piston rod 2 are being pushed in, the same sequence takes place as during the push-out movement.

Since there is no significant damping right at the start of the push-in action, the tailgate can be closed without much effort.

Damping is not effected again until the end of the push-in action, so that, even if the tailgate is closed forcibly, the speed is reduced to such an extent that the tailgate can drop into the lock only at a defined speed.

Figure 5:
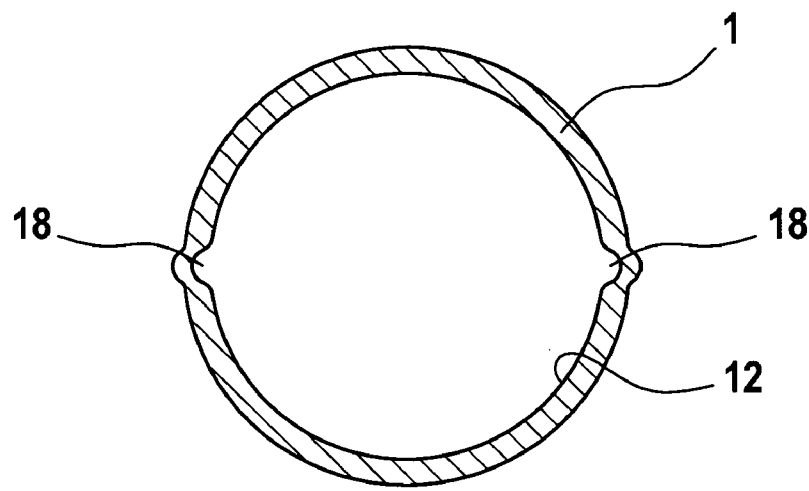
FIG. 5 shows a cross section of a second exemplary embodiment of a cylinder of a gas spring of the present invention.

As FIG. 5 shows, two grooves 18 may also be formed on the inner wall of the cylinder 1 instead of only one groove 18.

Figure 6:
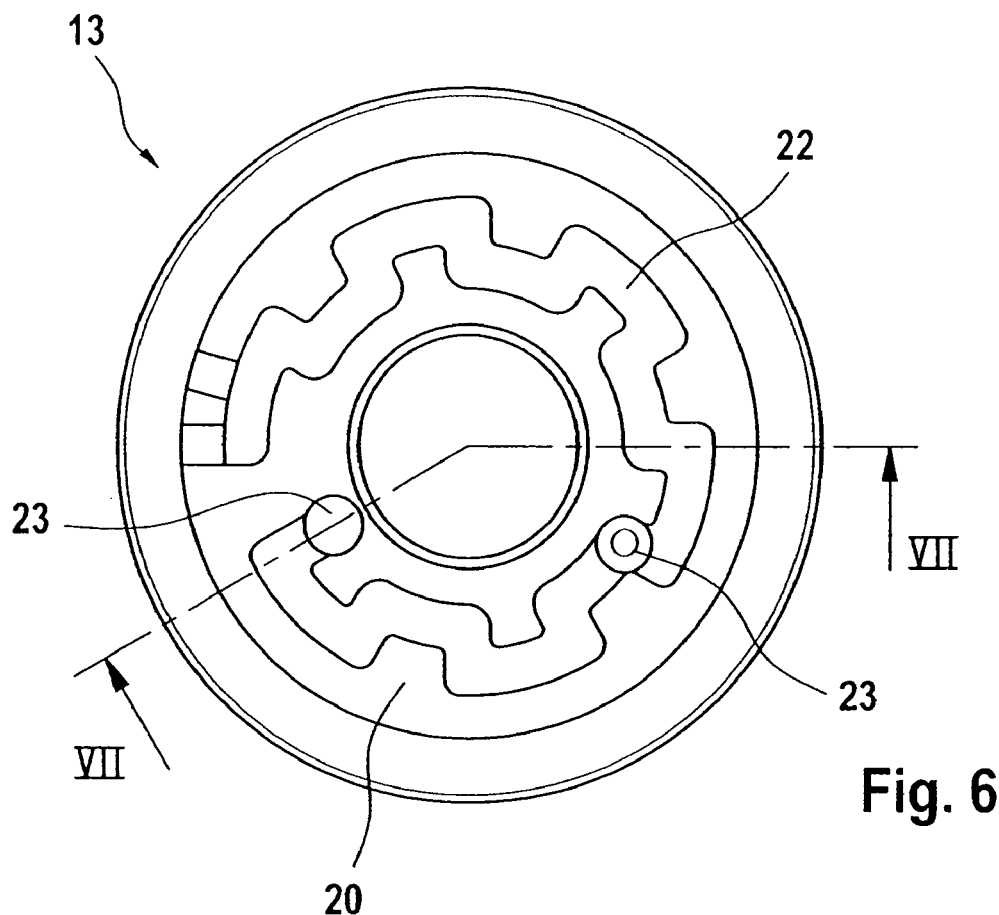
FIG. 6 shows an end view of a further exemplary embodiment of a first groove side wall from the spacer sleeve side.
Figure 7:
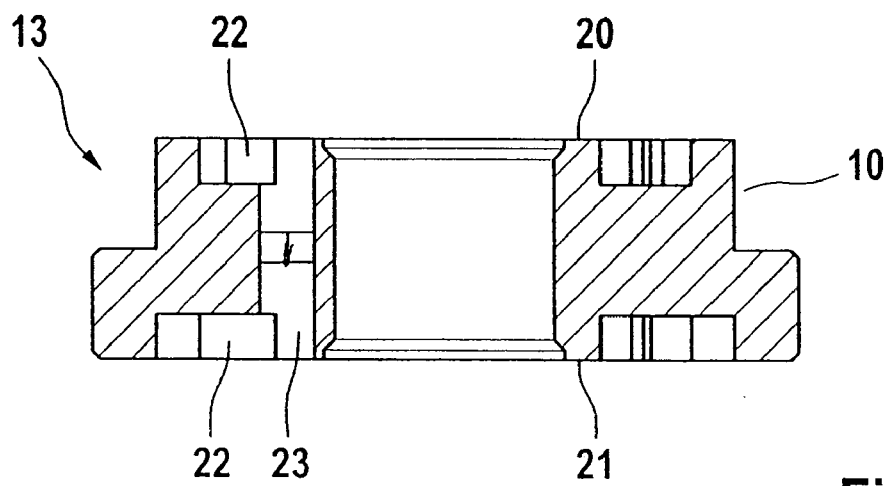
FIG. 7 shows a section through the first groove side wall according to FIG. 6 along line VII-VII in FIG. 6.

Shown in FIGS. 6 and 7 is a first groove side wall 13, is configured with a cylindrical extention of reduced diameter and with the radially encircling lateral surface which forms the base of the piston groove 10.

Incorporated in the end faces 20 and 21 of this component are labyrinth-like, axially open grooves, the one end of which is closed and which are connected to one another by axial holes 23. The groove on the end face 20 is axially covered and closed by the star disc 9 and opens with its one end directly next to the star disc 9 radially outwards into the base of the piston groove 10. The other end of this groove is closed.

The groove on the end face 21 is axially covered and closed by the spacer sleeve 14 and opens radially outwards with its one end at the radially encircling lateral surface of the piston 15. The other end of this groove is likewise closed.

The grooves together with the holes 23 form a damping channel 22, through which pressurized gas can always flow from one working chamber to the other working chamber.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A gas spring with end position damping, comprising:
    a cylinder defining an interior space filled with a fluid under pressure and having an inner wall extending between an outer end and a closed inner end;
    a rod sealingly extending from within the cylinder through the outer end of the cylinder,
    first and second pistons fastened to the rod so that the second piston is axially spaced from the first piston towards the inner end of the cylinder, the first and second pistons being axially displaceable with the rod along a path, the first and second pistons forming a piston assembly dividing the interior space into first and second cylinder chambers, each of the first and second pistons comprising:
        axially spaced first and second walls defining an annular groove therebetween, the second wall having a plurality of continuously throughflow openings, and
        a sealing ring received in the annular groove so as to bear against the inner wall of the cylinder and be axially movable within the annular groove, the sealing ring and the rod defining a passage therebetween in flow communication with the plurality of continuously open throughflow openings in the second wall,
    wherein the second wall of the first piston faces the first cylinder chamber and the second wall of the second piston faces the second cylinder chamber, whereby the first and second pistons are arranged in diametrically opposed positions on the piston rod; and
    at least one axial recess extending in the inner wall of the cylinder over the path of the pistons, the at least one axial recess being configured with a middle cylindrical region and opposite frustoconical end regions, the end regions narrowing towards respective opposite outer and closed inner ends of the cylinder.

2. The gas spring of claim 1, further comprising a spacer fastened to the rod between the first and second pistons and displaceable therewith along the path, wherein the spacer has a diameter smaller than a diameter of each of the first and second pistons.

3. The gas spring of claim 2, wherein the rod has a stem extending through axial holes formed in the first and second pistons and spacer.

4. The gas spring of claim 3, wherein the spacer is a sleeve.

5. The gas spring of claim 1, wherein the first and second end regions of the at least one axial recess have a uniform length substantially equal to a distance between the annular grooves of the first and second pistons.

6. The gas spring of claim 1, wherein the sealing ring has a rectangular cross-section.

7. The gas spring of claim 1, wherein the second wall of each of the first and second pistons is a star disc provided with a plurality of angularly spaced apart serrations defining the plurality of continuously open throughflow openings therebetween.

8. The gas spring of claim 1, wherein the first wall of at least one of the first and second pistons comprises one or a plurality of axially extending continuous connecting openings.

9. The gas spring of claim 8, wherein the connecting openings are capable of being selectively shut off in opposite directions of flow between the first and second chambers.

10. The gas spring of claim 9, further comprising a plurality of non-return valves each mounted in a respective one of the plurality of the connecting openings.

11. The gas spring of claim 8, wherein each of the plurality of connecting openings has a non-uniform cross-section.

12. The gas spring of claim 8, wherein the continuous openings each form part of a damping channel having opposite ends, one of the opposite ends of the damping channel opening into a radially outer surface of a respective one of the first and second pistons, and the other end of the damping channel opening into the passage between sealing ring and the rod.

13. The gas spring of claim 12, wherein at least a part of the damping channel is configured as a labyrinth.

14. The gas spring of claim 1, wherein the second chamber of the cylinder extends in a substantially axial vertical plane and has a chamber end region defined between one of the end regions of the at least one axial recess and the closed end of the cylinder and filled with a hydraulic fluid.

15. The gas spring of claim 14, wherein the hydraulic fluid comprises oil.

16. The gas spring of claim 1, wherein the first and second walls of the first piston are identical to the first and second walls of the second piston.

17. The gas spring of claim 1, wherein the at least one axial recess extends along a substantial portion of the path.

\* \* \* \* \*